(12) United States Patent
Chen et al.

(10) Patent No.: US 9,596,636 B2
(45) Date of Patent: Mar. 14, 2017

(54) METHOD PERFORMED BY A NETWORK NODE, NETWORK NODE AND COMPUTER PROGRAM FOR SUPPORTING CELL SELECTION OF USER EQUIPMENTS IN A WIRELESS COMMUNICATION NETWORK

(71) Applicant: Telefonaktiebolaget L M Ericsson (publ), Stockholm (SE)

(72) Inventors: Tsao-Tsen Chen, Taby (SE); Fredric Kronestedt, Ekero (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/441,019

(22) PCT Filed: Dec. 3, 2012

(86) PCT No.: PCT/EP2012/074227
§ 371 (c)(1),
(2) Date: May 6, 2015

(87) PCT Pub. No.: WO2014/086387
PCT Pub. Date: Jun. 12, 2014

(65) Prior Publication Data
US 2015/0304924 A1    Oct. 22, 2015

(51) Int. Cl.
*H04W 36/20* (2009.01)
*H04W 36/22* (2009.01)
(Continued)

(52) U.S. Cl.
CPC ............ *H04W 36/20* (2013.01); *H04W 4/04* (2013.01); *H04W 36/22* (2013.01); *H04W 36/32* (2013.01); *H04W 48/20* (2013.01)

(58) Field of Classification Search
None
See application file for complete search history.

(56) References Cited

U.S. PATENT DOCUMENTS 6,975,865 B1 * 12/2005 Vaisanen .............. H04W 16/16
                                                          370/329
8,320,331 B2 * 11/2012 Vikberg ............... H04W 24/02
                                                          370/331
(Continued)

OTHER PUBLICATIONS

International Search Report issued in corresponding International application No. PCT/EP2012/074227, date of mailing of the report Aug. 5, 2013.
(Continued)

*Primary Examiner* — Bunjob Jaroenchonwanit
(74) *Attorney, Agent, or Firm* — Patent Portfolio Builders PLLC (57) ABSTRACT

A method is described performed by a network node for supporting cell selection of user equipments, UEs, in a wireless communication network. The wireless communication network comprises low power nodes, LPN (230, 240), and high power nodes, HPN (210, 220). The LPNs and the HPNs are arranged to transmit signals wirelessly to UEs (251-254). The method comprises identifying (302) cell range expansion, CRE, areas of a group of LPNs, which CRE areas experience interference from a group of HPNs. The method further comprises counting (306) the number of HPNs in the group of HPNs and the number of LPNs in the group of LPNs, and when the numerical relation between the number of LPNs and the number of HPNs fulfills a predefined criterion, triggering (310) connection of a UE situated in any of the identified CRE areas to the LPN of the identified CRE area in which the UE is situated, and when the numerical relation between the number of LPNs and the number of HPNs does not fulfill the predefined criterion, triggering (312) connection of a UE situated in any of the identified CRE areas to one of the HPNs of the group of HPNs.

19 Claims, 5 Drawing Sheets

(51) Int. Cl.
*H04W 48/20* (2009.01)
*H04W 4/04* (2009.01)
*H04W 36/32* (2009.01)

(56) References Cited

U.S. PATENT DOCUMENTS

| | | | |
|---|---|---|---|
| 2009/0092081 A1* | 4/2009 | Balasubramanian | H04J 11/0093 370/328 |
| 2011/0275394 A1* | 11/2011 | Song | H04W 72/082 455/509 |
| 2011/0294508 A1* | 12/2011 | Min | H04W 36/0083 455/436 |
| 2011/0319090 A1* | 12/2011 | Vajapeyam | H04W 24/02 455/450 |
| 2012/0040683 A1 | 2/2012 | Shan et al. | |
| 2012/0044818 A1* | 2/2012 | Lindoff | H04L 1/0036 370/252 |
| 2012/0046030 A1* | 2/2012 | Siomina | G01S 5/00 455/423 |
| 2012/0122472 A1* | 5/2012 | Krishnamurthy | H04L 5/0053 455/456.1 |
| 2012/0282864 A1* | 11/2012 | Dimou | H04W 36/22 455/67.14 |
| 2015/0173103 A1* | 6/2015 | Lunden | H04L 67/1097 370/331 |

OTHER PUBLICATIONS

Written Opinion of the International Searching Authority issued in corresponding International application No. PCT/EP2012/074227, date of mailing of the opinion Aug. 5, 2013.

Damnjanovic, Aleksandar et al., "A Survey on 3GPP Heterogenous Networks," IEEE Wireless Communications, vol. 18, Issue 3, pp. 10-21, Jun. 16, 2011, ISSN: 1536-1284, DOI: 10.1109/MWC.2011.5876496.

Parkvall, Stefan et al., "Heterogenous network deployments in LTE," Ericsson Review, No. 1, 2011, 4G: LTE/LTE-Advanced for Mobile Broadband, Elsevier, 2011.

Medbo, J. et al., "Multi-Frequency Path Loss in an Outdoor to Indoor Macrocellular Scenario," 3rd European Conference on Antennas and Propagation (EuCAP 2009), IEEE, Mar. 23-27, 2009, pp. 3601-3605, Berlin, Germany, E-ISBN: 978-3-00-024573-2, Print ISBN: 978-1-4244-4753-4.

3GPP, 3rd Generation Partnership Project; Technical Specification Group Radio Access Network; Evolved Universal Terrestrial Radio Access Radio Access (E-UTRA) and Evolved Universal Terrestrial Radio Access Network (E-UTRAN); Overall description; Stage 2 (Release) 10, 3GPP TS 36.300 V10.2.0 (Dec. 2010).

* cited by examiner

Fig. 5

METHOD PERFORMED BY A NETWORK NODE, NETWORK NODE AND COMPUTER PROGRAM FOR SUPPORTING CELL SELECTION OF USER EQUIPMENTS IN A WIRELESS COMMUNICATION NETWORK

TECHNICAL FIELD

The present disclosure relates generally to a method performed by a network node, a network node and a computer program for supporting cell selection of user equipments in a wireless communication network.

BACKGROUND

In a heterogeneous wireless cellular communication network, Het net, low power nodes, LPN, such as pico base stations, may be mixed with high power nodes, HPN, such as macro base stations. A LPN transmits downlink, DL, signals with a lower power than a HPN. A LPN output power may for example in an in-building solution be in the range of 100 mW whereas an output power of a HPN may be in the range of 5 W to 60 W.

The coverage of a LPN may be limited by a neighboring HPN. A UE is usually instructed to select serving base station based on received signal strength. If the signal strength of a signal received from a HPN is higher than the signal strength of a signal received from a LPN, the HPN is selected as the serving base station for the UE. However, the HPN may not be the best choice for the UE in terms of uplink, UL, signal strength. In other words, the UE has to send UL signals with higher signal strength to a HPN than to a LPN that is situated closer to the UE. Thereby, more power is consumed for the UE, if it communicates with the HPN than the LPN. For this reason, and also for network resource utilization purposes, cell range expansion, CRE, may be used in the network. For CRE, a handover bias can be added in favor of the LPN, meaning that for selecting the HPN as serving base station, the received signal strength from the HPN has to be more than the received signal strength from the LPN plus a bias value. Consequently, the coverage of the LPN is increased without increasing the output power of the LPN.

However, UEs that are situated in a CRE area and that communicate with the LPN will experience strong DL interference from the HPN. For this reason, interference management schemes are needed between the HPN and the LPN such that the HPN has a transmission interrupt or transmits Almost Blank Subframes, ABS, in a transmission time interval, TTI, when the LPN is scheduled to transmit to the UE residing in a CRE area. ABS is standardized in 3GPP for LTE. In other words, ABS is used at the HPN when the LPN is transmitting, such that at the UE the signals from the HPN are not interfering with the signals from the LPN. This means that network resources from a HPN are temporarily not utilized during a TTI (or a subframe), network resources that could otherwise have been used for e.g. supporting UEs residing in the coverage area of the HPN. Consequently, there is an interest in a wireless communication network to balance the advantages of connecting UEs situated in a CRE area of a LPN to the LPN with the drawbacks of having a HPN reducing the transmitting activity during the subframes when the LPN transmits to such a UE.

SUMMARY

It is an object of the invention to address at least some of the problems and issues outlined above. It is possible to achieve these objects and others by using a method and an apparatus as defined in the attached independent claims.

According to one aspect, a method is provided performed by a network node for supporting cell selection of user equipments, UEs, in a wireless communication network. The wireless communication network comprises low power nodes, LPN, and high power nodes, HPN. The LPNs and the HPNs are arranged to transmit signals wirelessly to UEs. The method comprises identifying cell range expansion, CRE, areas of a group of LPNs, which CRE areas experience interference from a group of HPNs. The method further comprises counting the number of HPNs in the group of HPNs and the number of LPNs in the group of LPNs, and when the numerical relation between the number of LPNs and the number of HPNs fulfills a predefined criterion, triggering connection of a UE situated in any of the identified CRE areas to the LPN of the identified CRE area in which the UE is situated, and when the numerical relation between the number of LPNs and the number of HPNs does not fulfill the predefined criterion, triggering connection of a UE situated in any of the identified CRE areas to one of the HPNs of the group of HPNs.

According to another aspect, a network node is provided configured for supporting cell selection of user equipments, UEs, in a wireless communication network. The wireless communication network comprises low power nodes, LPN, and high power nodes, HPN. The LPNs and the HPNs are arranged to transmit signals wirelessly to UEs. The network node comprises an identifying unit (402) for identifying cell range expansion, CRE, areas of a group of LPNs, which CRE areas experience interference from a group of HPNs. The network node further comprises a counting unit (404) for counting the number of HPNs in the group of HPNs and the number of LPNs in the group of LPNs. The network node further comprises a triggering unit (406) for triggering connection of a UE situated in any of the identified CRE areas to the LPN of the identified CRE area in which the UE is situated, when the numerical relation between the number of LPNs and the number of HPNs fulfills a predefined criterion, and for triggering connection of a UE that is situated in any of the identified CRE areas to one of the HPNs of the group of HPNs, when the numerical relation between the number of LPNs and the number of HPNs in the group does not fulfill the predefined criterion.

According to a third aspect, a computer program is provided comprising computer readable code means, which when run in a network node causes the network node to perform the following. Identifying cell range expansion, CRE, areas of a group of LPNs, which CRE areas experience interference from a group of HPNs. Counting the number of HPNs in the group of HPNs and the number of LPNs in the group of LPNs. When the numerical relation between the number of LPNs and the number of HPNs fulfills a predefined criterion, triggering connection of a UE situated in any of the identified CRE areas to the LPN of the identified CRE area in which the UE is situated. When the numerical relation between the number of LPNs and the number of HPNs does not fulfill the predefined criterion, triggering connection of a UE situated in any of the identified CRE areas to one of the HPNs of the group of HPNs.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided that balances the usage of CRE in a cell, for a certain geographical position of the UE, based on the number of HPNs in a group of HPNs that have to temporarily reduce their transmission activity during the subframe when the LPN is transmitting to such a UE, in relation to the number of LPNs that may benefit from the same group of HPNs reducing their activity. This may be achieved by identifying CRE areas of a group of LPNs, whose CRE areas experience interference from a group of HPNs, i.e. the same HPNs. Thereafter, the number of LPNs in the group of LPNs that can serve UEs situated in the identified CRE areas is compared with the number of HPNs in the group of HPNs. If a numerical relation between the number of LPNs and the number of HPNs is fulfilled, the UE may be connected to one of the LPNs in the group. If the numerical relation is not fulfilled, the UE may be connected to one of the HPNs in the group.

In an embodiment, if the number of LPNs is higher than the number of HPNs, the UE is connected to one of the LPNs in the group. In other words, CRE is performed for this UE. If the number of LPNs is lower than the number of HPNs, the UE is connected to one of the HPNs in the group. That is, resource utilization may be more efficient if CRE is allowed for the scenario where the number of HPNs, which need to perform ABS and will waste some network resources, is lower than the number of LPNs, which can schedule transmission to UEs in the CRE areas and improve resource utilization.

Figure 1:
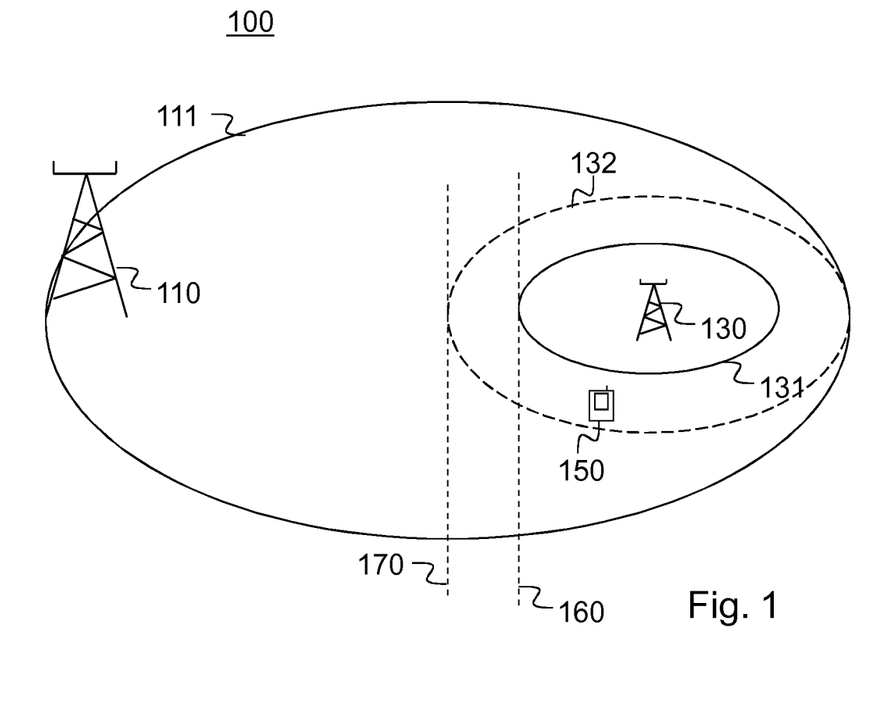
FIG. 1 is a schematic overview of an exemplary Het net having one HPN and one LPN.

FIG. 1 shows a part of an exemplary Het net 100 comprising two base stations in shape of a HPN 110 covering a HPN area 111, which may be a macro cell, and a LPN 130 covering a LPN area 131, which may be a pico cell. The LPN area 131 is usually limited to a signal strength border, e.g. a Reference Signal Received Power, RSRP, border 160. At the RSRP border, the DL RSRP from the HPN 110 is equal to the DL RSRP from the LPN 130. A UE 150 may be connected to the LPN 130 if it is positioned inside the LPN area and connected to the HPN 110 if it is positioned outside the LPN area 131 but inside the HPN area 111. When CRE is employed for the LPN 130, the LPN area is extended to include an extended LPN area 132 limited at a CRE border 170, where the $RSRP_H = RSRP_L + bias$ value. $RSRP_H$ is RSRP for the HPN and $RSRP_L$ is RSRP for the LPN. The bias value may for example be set such that the CRE border 170 coincides with a pathloss border, i.e. where the pathloss for DL HPN signals is similar to the pathloss for DL LPN signals.

The extended LPN area, as well as all coverage areas, may not be a continuous area as shown in FIG. 1. There may exist holes inside the extended LPN area 132 marked in the figure which will still be served by the HPN due to, e.g. radio propagation conditions. When the UE 150 is in the extended LPN area 132 outside the LPN area 131 the UE experiences strong interference from the HPN 110. To reduce this interference at the UE, DL transmission from the HPN is set to a reduced transmission activity in some subframes and DL transmission can be performed from the LPN towards the UE 150 during these subframes. This means that HPNs have to reduce their transmission activity for making it possible for LPNs to use CRE. Embodiments of the invention deal with when to use CRE and not to use CRE in a wireless network to improve network performance.

Figure 2:
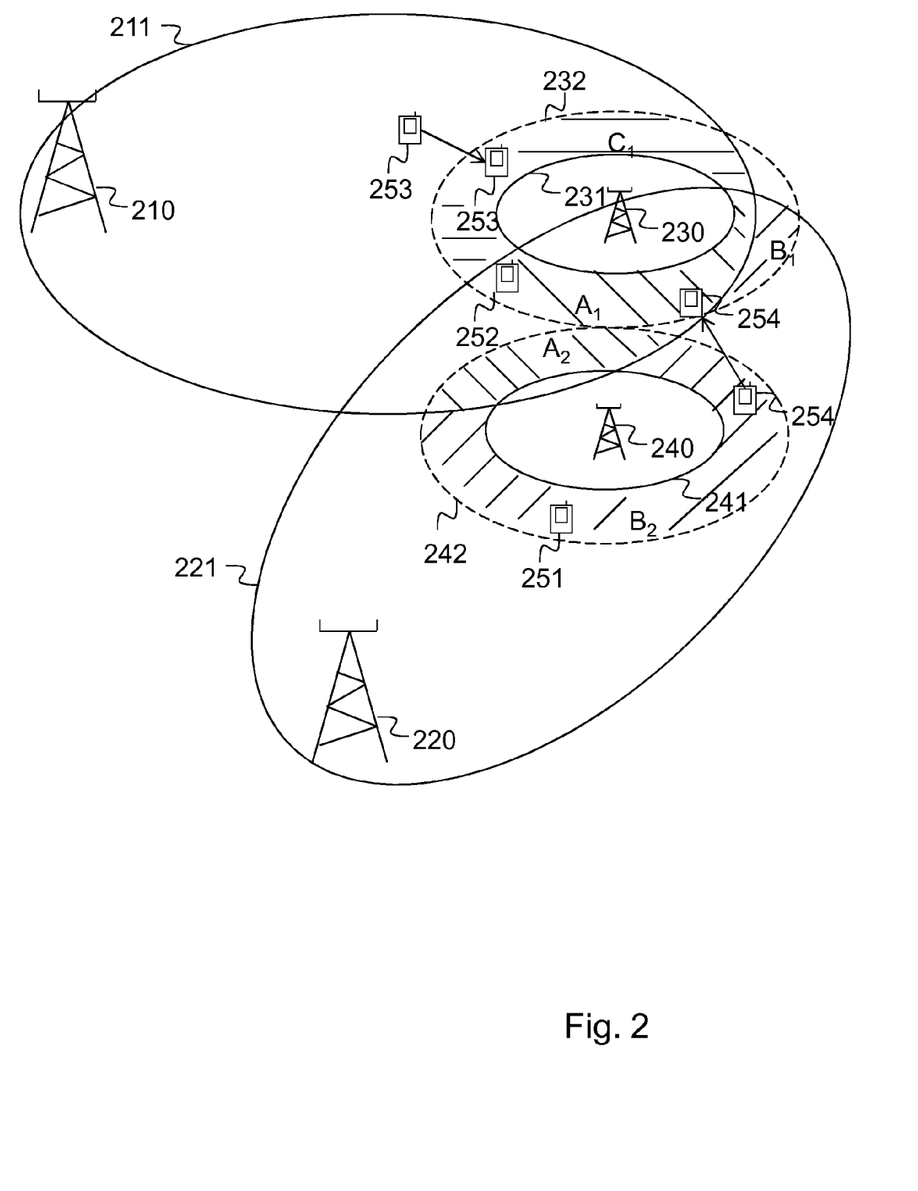
FIG. 2 is a schematic overview of an exemplary Het net having two HPNs and two LPNs in which the present invention may be used.

FIG. 2 shows an exemplary Het net in which the invention may be used. The Het net comprises a first HPN 210 providing coverage to a first HPN area 211 and a second HPN 220 providing coverage to a second HPN area 221. The Het net further comprises a first LPN 230 providing coverage to a first LPN area 231 and to a first extended LPN area 232 outside the first LPN area 231 by using CRE. The Het net further comprises a second LPN 240 providing coverage to a second LPN area 241 and to a second extended LPN area 242 outside the second LPN area 241 by using CRE. FIG. 2 further shows a number of UEs 251-254 positioned in various positions in the Het net.

According to an embodiment, CRE areas of a group of LPNs that experience interference from the same group of HPNs are identified. A CRE area may be a part of an extended LPN area. In FIG. 2, CRE area $A_1$ is the part of first extended LPN area 232 that is covered by both the first HPN 210 and the second HPN 220. CRE area $A_2$ is the part of second extended LPN area 242 that also is covered by both the first HPN 210 and the second HPN 220. Consequently, the CRE areas $A_1$ and $A_2$ are identified to experience interference from the same group of HPNs, i.e. the first HPN and the second HPN, and consequently belong to the same group of LPNs, called group A. The CRE areas $A_1$ and $A_2$ are marked with the same type of inclined lines in FIG. 2. CRE area $B_1$, on the other hand, is the part of first extended LPN area 232 that is covered by only the second HPN 220 of the HPNs. CRE area $B_2$ is the part of second extended LPN area 242 that also is covered by only the second HPN 220. Consequently, the CRE areas $B_1$ and $B_2$ are identified to experience interference from the same group of HPNs, i.e. only the second HPN. The CRE areas $B_1$ and $B_2$ are marked with the same type of inclined lines in FIG. 2, different from the inclined lines of CRE areas $A_1$ and $A_2$. Further, CRE area $C_1$ is identified as experiencing interference from the first HPN 210. Below is a table illustrating the identifying of CRE areas.

|  | Group A | Group B | Group C |
| --- | --- | --- | --- |
| CRE areas | $A_1, A_2$ | $B_1, B_2$ | $C_1$ |
| HPNs for group | First HPN, Second HPN | Second HPN | First HPN |
| LPNs for group | First LPN, Second LPN | First LPN, Second LPN | First LPN |
| Relation Nr of LPNs/Nr of HPNs | 2/2 | 2/1 | 1/1 |

Further, the number of HPNs and the number of LPNs for each group is counted. For example, in group A, there are 2 LPNs and 2 HPNs. This means that for being able to use CRE for a UE being in CRE areas A1 or A2, two HPNs have to be in reduced transmission activity in the subframes when two LPNs have the possibility of transmitting. Further, in group B there are 1 HPN and 2 LPNs. In group C there are 1 HPN and 1 LPN. This is also illustrated in the table above.

Thereafter, the numerical relation between the number of LPNs and the number of HPNs in a group decides if CRE is to be used for a UE situated in the CRE area. For example, it may be decided that if the number of LPNs is higher than the number of HPNs in a group, a connection is triggered to the LPN of the identified CRE area, for a UE situated in any of the identified CRE areas of the group. On the other hand, if the number of LPNs is not higher than the number of HPNs in a group, a connection is triggered for a UE situated in any of the identified CRE areas of the group to one of the HPNs in the group. In FIG. 2, UE 251 is situated in CRE area $B_2$. CRE area $B_2$ belongs to group B. In group B the number of LPNs is 2 and the number of HPNs is 1, i.e. the number of LPNs is higher than the number of HPNs. Consequently, UE 251 is connected to LPN 240. UE 252, on the other hand, is situated in CRE area $A_1$. CRE area $A_1$ belongs to group A. In group A the number of LPNs is 2 and the number of HPNs is 2, i.e. the number of LPNs is the same, i.e. not higher, than the number of HPNs. Consequently, UE 252 is connected to any of the HPNs 210 or 220, probably to the HPN with the highest signal strength, which may be the first HPN 210 in the case of FIG. 2.

In FIG. 2, two UEs 253 and 254 are shown that are moving in the network. UE 253 moves from a location where it is connected to the first HPN 210 into the CRE area $C_1$. Depending on the numerical relation between the number of LPNs and the number of HPNs in group C it is decided whether to handover UE 253 to the first LPN 230 or whether to let UE 253 stay connected to the first HPN 210. In group C the number of HPNs and the number of LPNs is 1. I.e. the numbers are equal. Let us say that the decision point is: If the number of LPNs is higher than or equal to the number of HPNs in the group, connect to the LPN, otherwise connect to the HPN. In that case the UE 253 is handed over to the first LPN 230. Let us say that the decision point is: If the number of LPNs is higher than the number of HPNs in the group, connect to the LPN, otherwise connect to the HPN. In that case the UE 253 stays connected to the first HPN 210.

UE 254, on the other hand, moves from a location in CRE area $B_2$, where it is connected to the second LPN 240 into the CRE area $A_1$. Depending on the numerical relation between the number of LPNs and the number of HPNs in group A it is decided whether to handover UE 254 to the first LPN 230 or whether to let UE 254 be handed over to a HPN. In group A the number of HPNs and the number of LPNs is 2. I.e. the numbers are equal. Let us say that the decision point is: If the number of LPNs is higher than or equal to the number of HPNs in the group, connect to the LPN, otherwise connect to the HPN. In that case the UE 254 is handed over to the first LPN 230. Let us say that the decision point is: If the number of LPNs is higher than the number of HPNs in the group, connect to the LPN, otherwise connect to the HPN. In that case the UE 254 is handed over to any of the first or second HPNs 210, 220.

The examples above were shown for a small network only comprising two HPNs and two LPNs, although, it may as well be used in a large network comprising a plurality of HPNs and a plurality of LPNs with partly overlapping coverage areas. It may be especially advantageous in in-building solutions, i.e. in wireless networks where buildings are equipped with LPNs on each floor, or on some floors of a building, and where there are also HPNs providing coverage across a number of buildings. The LPNs may provide coverage to a part of a floor or to more than one floor. If a HPN provides coverage to an extended LPN area of one floor such that it has higher signal strength in the extended LPN area than the LPN of the same area, it will also probably interfere with a LPN on the floors above this floor. It is for example probable that many floors or parts of floors may be in line-of sight from a HPN. Consequently, many floors of the same building may have CRE areas experiencing interference from the same HPNs. Also, it may be possible that floors from different buildings have CRE areas experiencing interference from the same HPNs.

Figure 3:
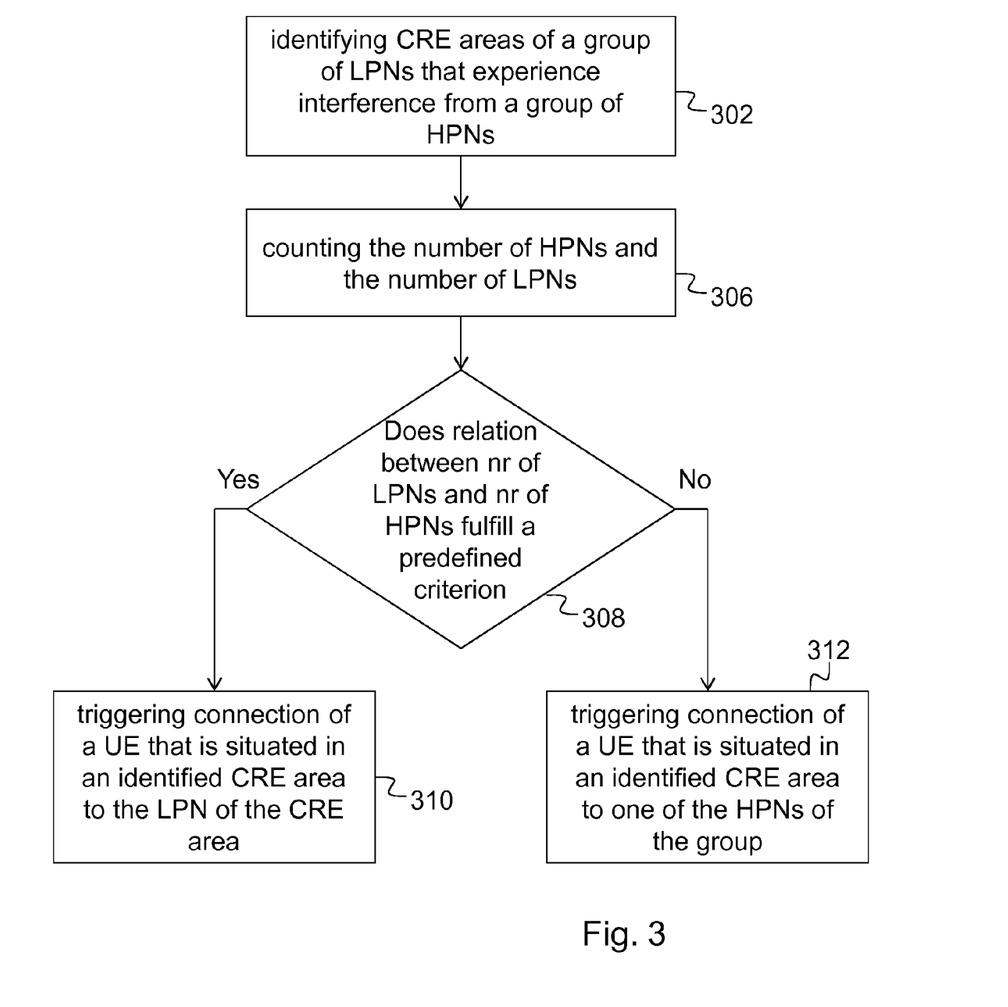
FIG. 3 is a flow chart illustrating a method in a network node, according to possible embodiments.

FIG. 3 describes a method according to an embodiment performed by a network node for supporting cell selection of user equipments, UEs, in a wireless communication network. The wireless communication network comprises low power nodes, LPN 230, 240, (see FIG. 2) and high power nodes, HPN 210, 220. The LPNs and the HPNs are arranged to transmit signals wirelessly to UEs 251-254. The method comprises identifying 302 CRE areas of a group of LPNs, which CRE areas experience interference from a group of HPNs. The method further comprises counting 306 the number of HPNs in the group of HPNs and the number of LPNs in the group of LPNs. Further, it is checked 308 whether or not a numerical relation between the number of LPNs and the number of HPNs fulfills a predefined criterion. The method further comprises, when the numerical relation between the number of LPNs and the number of HPNs fulfills a predefined criterion, triggering 310 a connection of a UE situated in any of the identified CRE areas to the LPN of the identified CRE area in which the UE is situated. The method further comprises, when the numerical relation between the number of LPNs and the number of HPNs does not fulfill the predefined criterion, triggering 312 connection of a UE situated in any of the identified CRE areas to one of the HPNs of the group of HPNs.

An extended LPN area is a geographical area where a received HPN signal strength of a DL signal transmitted from a HPN is higher than a received LPN signal strength of a DL signal transmitted from a LPN, but lower than the received LPN signal strength added with a bias value. A CRE area is part of an extended LPN area.

A high power node is a network node that transmits wireless signals to UEs (downlink transmission) with a high power, in comparison to a low power node, which transmits wireless signals to UEs with a lower power than the high power node. The high power node may be a macro base station and the low power node may be a pico base station, although, any other relation where the high power node transmits with a higher power than the low power node may be used, such as the high power node being a macro base station and the low power node being a micro base station.

By adapting usage of CRE to the number of LPNs and the number of HPNs that are influenced by a decision of using CRE for UE, it is possible to improve performance of the wireless network. In other words, by the method described above it is possible to adapt usage of CRE in a wireless network to improve network performance.

According to an embodiment, the CRE areas that experience interference from a group of HPNs are geographical areas within one or more floors of one or more buildings. The method is especially advantageous to use in dense populated regions such as a region with in-building solutions, i.e. a region where there are LPNs covering floors of buildings and HPNs covering larger areas of the region, including parts of the floors of buildings. Also, the solution is especially advantageous for in-building solutions since there is small interference between neighboring LPNs of different building floors. Thus, these LPNs can schedule the transmission to UEs in their CRE areas during the same subframes with small interference to each other.

According to an embodiment, the identifying 302 of CRE areas is performed based on measurements performed at the extended LPN areas of received signal strength values for signals sent from the LPNs and the HPNs of the communication network. Alternatively, the identifying 302 of CRE areas is performed based on statistical values of measurements performed at the extended LPN areas of received signal strength values for signals sent from the LPNs and the HPNs of the communication network.

The extended LPN area may be divided into smaller areas, called bins, and each bin may be as small as 5*5 meters, or even smaller, depending on requested geographical detail of the measurements. The CRE area thus consists of a number of bins. A signal strength value may be an RSRP measurement. The signal strength measurement may be performed at the central location of each bin, or in many different locations within each bin. The signal strength measurements may be performed by UEs travelling in the network. The UEs may be arranged to communicate the measurements to the network node via the LPN or HPN they are currently connected to. The statistical values may be an average of measurement values performed over a certain period of time. Thereby, e.g. short-term variations from fast fading may be minimized, and of course also any statistical short-term variations. Alternatively, the statistical values of signal strength may be achieved by test UEs performing drive tests or walk tests in the wireless network before the wireless network is in operation, or during operation of the wireless network. Alternatively, the statistical values of signal strength may be achieved by pathloss predictions, for example by a cell planning tool, over the coverage area of the wireless network.

According to an embodiment, the predefined criterion is that the number of LPNs is higher than the number of HPNs. Different criteria for the numerical relation between the number of LPNs and the number of HPNs may be used. If the criterion is set such that the number of LPNs should be much higher than the number of HPNs for performing CRE for a group of LPNs, it means that CRE is performed in a conservative way for better resource utilization. If the criterion is set such that the number of LPNs can be some units lower than the number HPNs and still CRE is performed it means that CRE is performed at the expense of less-efficient resource utilization. Alternatively, the selected criterion may depend on factors such as backhaul capacities of the LPNs. A higher numerical relation criterion, i.e. that the number of LPNs needs to be much higher, at least some units higher, than the number of HPNs in a group for performing CRE, can be used if the backhaul capacity of one or more of the LPNs in a group is low. Alternatively, the sizes of the CRE areas may be taken into account when deciding the numerical relation criteria. I.e. the larger the sizes of the CRE areas, or the summation of the sizes of CRE areas that are in a group, the larger the possibility of a UE residing in any of the CRE areas in the group. Therefore a lower numerical relation criterion, i.e. that the number of LPNs needs to be more than the number of HPNs by a smaller number, can be used if the sizes of the CRE areas are larger.

Also, the density of UEs in a CRE area may be taken into account. The higher the number of UEs in the CRE area, the more freedom for the LPN when scheduling the UEs in the selected subframe when the HPNs transmit ABSs. Also, it is more likely that the LPN can find and schedule a UE in the selected subframe. Consequently, a lower numerical relation criterion may be used if the subscriber density is higher than a regular value, According to an embodiment, the network node is a centralized node, such as an operation and maintenance, O&M, node. This embodiment may be called a centralized embodiment. In this embodiment, each HPN and LPN may compile signal strength measurements statistics from signal strength measurement reports from UEs served by the HPN or LPN. The centralized node receives the signal strength measurement statistics from the HPNs and LPNs and identifies the CRE areas of a group of LPNs that experience interference from a group of HPNs and may perform the rest of the method described above. Information of when to trigger connection of a UE to the LPN of the identified CRE area and when to trigger connection of the UE to a HPN of the group is then sent to the HPNs and LPNs.

According to another embodiment, the network node is a number of HPNs and LPNs. This embodiment may be called a decentralized embodiment. In the decentralized embodiment, each HPN and LPN may compile signal strength measurements statistics from signal strength measurement reports from UEs served by the HPN or LPN. The statistics are then exchanged among the involved HPNs and LPNs, and the method is performed in each HPN and LPN to create the information of when to trigger connection of a UE to the LPN of the identified CRE area and when to trigger connection of the UE to a HPN of the group.

The method may be used to improve existing handover algorithms. For the case that a UE is connected to a HPN and that the UE is moving into any of the identified CRE areas, the following may be performed. According to an embodiment, the step of triggering 310 connection of the UE to the LPN of the identified CRE area in which the UE is situated, is realized by triggering handover of the UE to the LPN of the identified CRE area to which the UE has moved, when the numerical relation between the number of LPNs and the number of HPNs fulfills the predefined criterion. The step of triggering 312 connection of a UE situated in any of the identified CRE areas to any of the HPNs in the group is realized by letting the UE stay connected with the HPN when the numerical relation between the number of LPNs and the number of HPNs does not fulfill the predefined criterion.

For the case that a UE is connected with a LPN and that the UE is moving into any of the identified CRE areas, the following may be performed. According to an embodiment, the step of triggering 310 connection of the UE to the LPN of the identified CRE area in which the UE is situated, is realized by triggering handover of the UE to the LPN of the identified CRE area to which the UE has moved, when the numerical relation between the number of LPNs and the number of HPNs fulfills the predefined criterion. The step of triggering 312 connection of a UE situated in any of the identified CRE areas to any of the HPNs in the group is realized by triggering handover of the UE to any of the HPNs in the group of HPNs when the numerical relation between the number of LPNs and the number of HPNs does not fulfill the predefined criterion. In the case that the UE is moving from a LPN area, such as the first LPN area 231, to an identified CRE area in the extended LPN area 232 of the same LPN 230, the step of triggering 310 connection of the UE to the LPN of the identified CRE area in which the UE is situated, is realized by letting the UE stay connected to the LPN 230, when the numerical relation between the number of LPNs and the number of HPNs fulfills the predefined criterion.

According to an embodiment, the method may be repeated a number of times for different CRE areas such that a number of LPN groups experiencing interference from different groups of HPNs are identified. The method may then further comprise prioritizing which LPN groups experiencing interference from the same group of HPNs is to be set with the highest priority for using CRE. The prioritization may be set such that the fewer HPNs in a group, the higher the priority. As a second prioritization order, if the number of HPNs is the same for two different groups, the group with the highest number of LPNs is prioritized before the group with the lower number of LPNs.

According to an embodiment, the method is repeated a number of times for different CRE areas such that a number of LPN groups experiencing interference from different groups of HPNs are identified. The method further comprises determining priority for using CRE for each LPN group experiencing interference from a group of HPNs such that the fewer HPNs in a group, the higher the priority. If the number of HPNs is the same for two different groups, the group with the highest number of LPNs is prioritized before the group with the lower number of LPNs.

Figure 4:
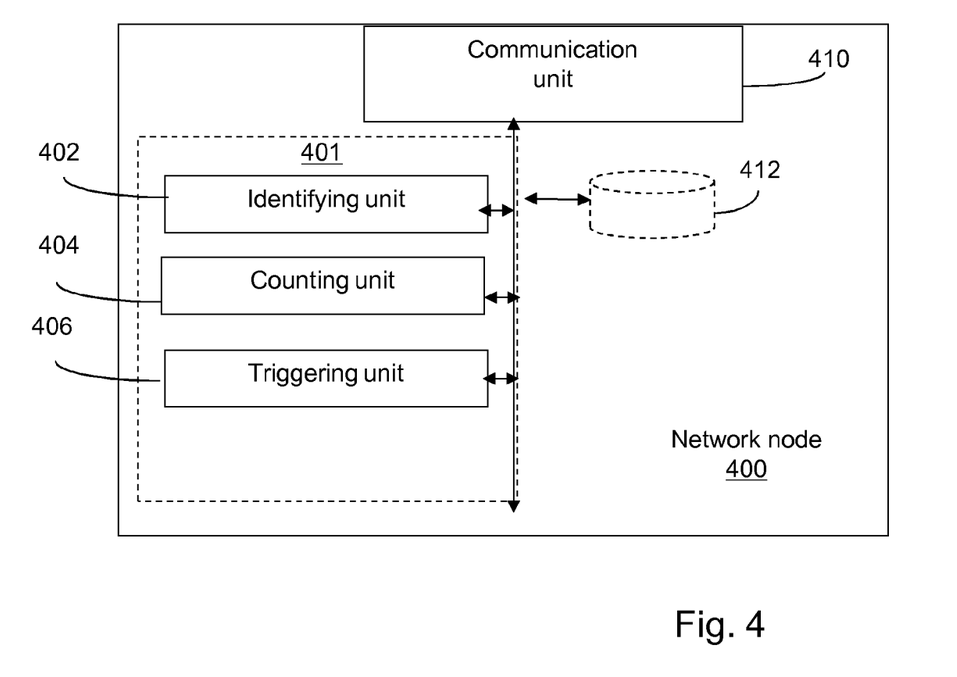
FIG. 4 is a schematic block diagram illustrating a network node in more detail, according to further possible embodiments.

FIG. 4 describes a network node 400 according to an embodiment, configured for supporting cell selection of user equipments, UEs, in a wireless communication network. The wireless communication network comprises LPNs 230, 240 and HPNs 210, 220. The LPNs and the HPNs are arranged to transmit signals wirelessly to UEs. The network node 400 comprises an identifying unit 402 for identifying cell range expansion, CRE, areas of a group of LPNs, which CRE areas experience interference from a group of HPNs. The network node further comprises a counting unit 404 for counting the number of HPNs in the group of HPNs and the number of LPNs in the group of LPNs. The network node further comprises a triggering unit 406 arranged for triggering connection of a UE situated in any of the identified CRE areas to the LPN of the identified CRE area in which the UE is situated, when the numerical relation between the number of LPNs and the number of HPNs fulfills a predefined criterion, and arranged for triggering connection of a UE that is situated in any of the identified CRE areas to one of the HPNs of the group of HPNs, when the numerical relation between the number of LPNs and the number of HPNs in the group does not fulfill the predefined criterion. The network node 400 may further comprise a communication unit 410, which may be considered to comprise conventional means for communication from and/or to other nodes or UEs of the wireless network. In case the network node 400 is a LPN or a HPN, the communication unit 410 may comprise a wireless communication part for communicating wirelessly with UEs, such as one or more transceivers. The network node 400 may further comprise other functional units (not shown) for providing e.g. regular network node functions. The network node 400 may further comprise one or more storage units 412.

The identifying unit 402, the counting unit 404 and the triggering unit 406 may be arranged in an arrangement 401. The arrangement 401 could be implemented e.g. by one or more of: a processor or a micro processor and adequate software and storage therefore, a Programmable Logic Device (PLD) or other electronic component(s)/processing circuit(s) configured to perform the actions, or methods, mentioned above.

According to an embodiment, the CRE areas that experience interference from a group of HPNs are geographical areas within one or more floors of one or more buildings.

According to another embodiment, the identifying unit 402 is arranged for identifying CRE areas based on measurements performed at the extended LPN areas of received signal strength values for signals sent from the LPNs and the HPNs of the communication network.

According to another embodiment, the predefined criterion is that the number of LPNs is higher than the number of HPNs.

According to another embodiment, the network node is an operation and maintenance node.

According to another embodiment, the network node is a distributed node, distributed among at least some of the HPNs and the LPNs in the wireless network.

According to another embodiment, for a UE connected to a HPN and that is moving into any of the identified CRE areas, the triggering unit 406 is arranged for triggering handover of the UE to the LPN of the identified CRE area to which the UE has moved, when the numerical relation between the number of LPNs and the number of HPNs fulfills the predefined criterion. Further, the triggering unit 406 is arranged for letting the UE stay connected with the HPN when the numerical relation between the number of LPNs and the number of HPNs does not fulfill the predefined criterion.

According to another embodiment, for a UE connected to a LPN and that is moving into any of the identified CRE areas, the triggering unit 406 is arranged for triggering handover of the UE to the LPN of the identified CRE area to which the UE has moved, when the numerical relation between the number of LPNs and the number of HPNs fulfills the predefined criterion. Further, the triggering unit 406 is arranged for triggering handover of the UE to one of the HPNs of the group of HPNs when the numerical relation between the number of LPNs and the number of HPNs does not fulfill the predefined criterion.

Figure 5:
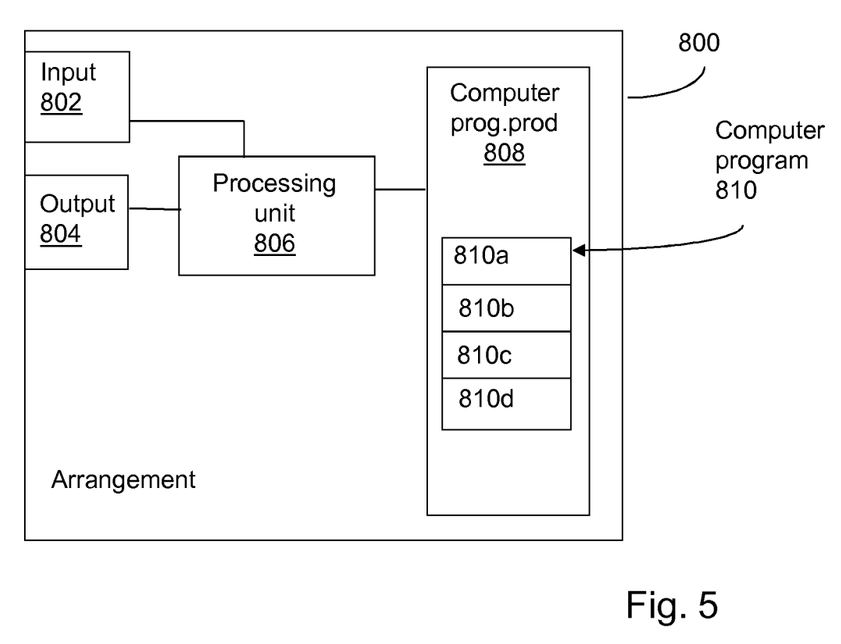
FIG. 5 is a schematic block diagram illustrating an arrangement of a network node in more detail, according to further possible embodiments.

FIG. 5 schematically shows an embodiment of an arrangement 800 for use in a network node 400, which also can be an alternative way of disclosing an embodiment of the arrangement 401 in a network node 400 illustrated in FIG. 4. Comprised in the arrangement 800 is a processing unit 806, e.g. with a Digital Signal Processor (DSP). The processing unit 806 may be a single unit or a plurality of units to perform different actions of procedures described herein. The arrangement 800 may also comprise an input unit 802 for receiving signals from other entities, and an output unit 804 for providing signal(s) to other entities. The input unit 802 and the output unit 804 may be arranged as an integrated entity.

Furthermore, the arrangement 800 comprises at least one computer program product 808 in the form of a non-volatile or volatile memory, e.g. an Electrically Erasable Programmable Read-only Memory (EEPROM), a flash memory, a disk drive or a Random-access memory (RAM). The computer program product 808 comprises a computer program 810, which comprises code means, which when executed in the processing unit 806 in the arrangement 800 causes the arrangement and/or the network node 400 to perform the actions of any of the procedures described earlier in conjunction with FIG. 3.

The computer program 810 may be configured as a computer program code structured in computer program modules. Hence, in an exemplifying embodiment, the code means in the computer program 810 of the arrangement 800 comprises an identifying module 810a for identifying CRE areas of a group of LPNs, which CRE areas experience interference from a group of HPNs. The computer program further comprises a counting module 810b for counting the number of HPNs in the group of HPNs and the number of LPNs in the group of LPNs. The computer program further comprises a first triggering module 810c for triggering connection of a UE situated in any of the identified CRE areas to the LPN of the identified CRE area in which the UE is situated, when the numerical relation between the number of LPNs and the number of HPNs fulfills a predefined criterion. The computer program further comprises a second triggering module 810d for triggering connection of a UE situated in any of the identified CRE areas to one of the HPNs of the group of HPNs, when the numerical relation between the number of LPNs and the number of HPNs does not fulfill the predefined criterion.

The methods and network nodes according to the invention describes ways to recommend when to use CRE for some combinations of LPN groups and HPN groups but not for other combinations in a way to improve resource utilization. In other words, efficient resource utilization is provided with minimal impact on surrounding HPNs.

Also, timing synchronization required during resource partitioning of each HPN is facilitated. The timing synchronization between each HPN and the LPNs can be done more efficiently if the LPNs in one group are situated in the same building or in nearby buildings.

Information that needs to be sent from a HPN to LPNs may be sent only to LPNs in the LPN group, thus reducing the load on signaling interfaces such as the X2 interface.

The invention may enable coordination of CRE and possibly also user scheduling across LPNs from several buildings that are close to each other. The cross building co-ordination may result in a larger LPN group and hence better resource utilization.

The invention may enable design of improved handover algorithms for the case when to apply CRE or not by taking into account the identification of a group of LPNs experiencing interference from a group of HPNs. This will reduce unnecessary handover from a HPN to a LPN or expedite handover from a LPN to another LPN or to a HPN.

Without CRE, more antennas and/or LPNs are needed in a wireless network, especially an in-building solution, for providing coverage to the same geographical area. The invention may enable efficient use of CRE to minimize investment of hardware, i.e. antennas and/or LPNs, in the wireless network. Without CRE, UEs in a CRE area will be served by HPNs and create strong interference to the LPN. The invention enables efficient use of CRE to reduce uplink interference from such UEs.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a network node or method to address each and every problem sought to be solved by the presently described concept, for it to be encompassed hereby.

The invention claimed is:

1. A method performed by a network node for supporting cell selection of user equipments, UEs, in a wireless communication network, the wireless communication network comprising low power nodes, LPN, and high power nodes, HPN, the LPNs and the HPNs being arranged to transmit signals wirelessly to UEs, the method comprising:
    identifying cell range expansion, CRE, areas of a group of LPNs, which CRE areas experience interference from a group of HPNs;
    counting the number of HPNs in the group of HPNs and the number of LPNs in the group of LPNs;
    when the numerical relation between the number of LPNs and the number of HPNs fulfills a predefined criterion, triggering connection of a UE situated in any of the identified CRE areas to the LPN of the identified CRE area in which the UE is situated,
    when the numerical relation between the number of LPNs and the number of HPNs does not fulfill the predefined criterion, triggering connection of a UE situated in any of the identified CRE areas to one of the HPNs of the group of HPNs.

2. Method according to claim 1, wherein the CRE areas that experience interference from a group of HPNs are geographical areas within one or more floors of one or more buildings.

3. Method according to claim 1, wherein the identifying of CRE areas is performed based on measurements performed at extended LPN areas of received signal strength values for signals sent from the LPNs and the HPNs of the communication network.

4. Method according to claim 1, wherein the identifying of CRE areas is performed based on statistical values of measurements performed at extended LPN areas of received signal strength values for signals sent from the LPNs and the HPNs of the communication network.

5. Method according to claim 1, wherein the predefined criterion is that the number of LPNs is higher than the number of HPNs.

6. Method according to claim 1, wherein the network node is an operation and maintenance node.

7. Method according to claim 1, wherein the network node is a distributed node, distributed among at least some of the HPNs and the LPNs in the wireless network.

8. Method according to claim 1, wherein, for a UE connected to a HPN and that is moving into any of the identified CRE areas, the steps of triggering are realized by triggering handover of the UE to the LPN of the identified CRE area to which the UE has moved when the numerical relation between the number of LPNs and the number of HPNs fulfills the predefined criterion, and by letting the UE stay connected with the HPN when the numerical relation between the number of LPNs and the number of HPNs does not fulfill the predefined criterion.

9. Method according to claim 1, wherein, for a UE connected to a LPN and that is moving into any of the identified CRE areas, the steps of triggering are realized by triggering handover of the UE to the LPN of the identified CRE area to which the UE has moved, when the numerical relation between the number of LPNs and the number of HPNs fulfills the predefined criterion, and triggering handover of the UE to one of the HPNs of the group of HPNs when the numerical relation between the number of LPNs and the number of HPNs does not fulfill the predefined criterion.

10. Method according to claim 1,
    wherein the method is repeated a number of times for different CRE areas such that a number of LPN groups experiencing interference from different groups of HPNs are identified, the method further comprising:

determining priority for using CRE for each LPN group experiencing interference from a group of HPNs such that the fewer HPNs in a group, the higher the priority.

11. A network node configured for supporting cell selection of user equipments, UEs, in a wireless communication network, the wireless communication network comprising low power nodes, LPN, and high power nodes, HPN, the LPNs and the HPNs being arranged to transmit signals wirelessly to UEs, the network node comprising:
- an identifying unit for identifying cell range expansion, CRE, areas of a group of LPNs, which CRE areas experience interference from a group of HPNs;
- a counting unit for counting the number of HPNs in the group of HPNs and the number of LPNs in the group of LPNs; and
- a triggering unit for triggering connection of a UE situated in any of the identified CRE areas to the LPN of the identified CRE area in which the UE is situated, when the numerical relation between the number of LPNs and the number of HPNs fulfills a predefined criterion, and for triggering connection of a UE that is situated in any of the identified CRE areas to one of the HPNs of the group of HPNs, when the numerical relation between the number of LPNs and the number of HPNs in the group does not fulfill the predefined criterion.

12. Network node according to claim 11, wherein the CRE areas that experience interference from a group of HPNs are geographical areas within one or more floors of one or more buildings.

13. Network node according to claim 11, wherein the identifying unit is arranged for identifying CRE areas based on measurements performed at extended LPN areas of received signal strength values for signals sent from the LPNs and the HPNs of the communication network.

14. Network node according to claim 11, wherein the predefined criterion is that the number of LPNs is higher than the number of HPNs.

15. Network node according to claim 11, wherein the network node is an operation and maintenance node.

16. Network node according to claim 11, wherein the network node is a distributed node, distributed among at least some of the HPNs and the LPNs in the wireless network.

17. Network node according to claim 11, wherein, for a UE connected to a HPN and that is moving into any of the identified CRE areas, the triggering unit is arranged for triggering handover of the UE to the LPN of the identified CRE area to which the UE has moved, when the numerical relation between the number of LPNs and the number of HPNs fulfills the predefined criterion, and the triggering unit is arranged for letting the UE stay connected with the HPN when the numerical relation between the number of LPNs and the number of HPNs does not fulfill the predefined criterion.

18. Network node according to claim 11, wherein, for a UE connected to an LPN and that is moving into any of the identified CRE areas, the triggering unit is arranged for triggering handover of the UE to the LPN of the identified CRE area to which the UE has moved, when the numerical relation between the number of LPNs and the number of HPNs fulfills the predefined criterion, and the triggering unit is arranged for triggering handover of the UE to one of the HPNs of the group of HPNs when the numerical relation between the number of LPNs and the number of HPNs does not fulfill the predefined criterion.

19. A non-transitory computer readable medium comprising computer readable code, which when run in a network node causes the network node to perform the following steps:
- identifying cell range expansion, CRE, areas of a group of LPNs, which CRE areas experience interference from a group of HPNs;
- counting the number of HPNs in the group of HPNs and the number of LPNs in the group of LPNs;
- when the numerical relation between the number of LPNs and the number of HPNs fulfills a predefined criterion, triggering connection of a UE situated in any of the identified CRE areas to the LPN of the identified CRE area in which the UE is situated,
- when the numerical relation between the number of LPNs and the number of HPNs does not fulfill the predefined criterion, triggering connection of a UE situated in any of the identified CRE areas to one of the HPNs of the group of HPNs.

* * * * *